United States Patent [19]
Nakasaki

[11] Patent Number: 5,209,794
[45] Date of Patent: May 11, 1993

[54] TIRE FOR MOTOR CYCLES INCLUDING A SPIRALLY WOUND AROMATIC POLYAMIDE CORD BELT

[75] Inventor: Eiji Nakasaki, Kakogawa, Japan

[73] Assignee: Sumitomo Rubber Industries, Ltd., Hyogo, Japan

[21] Appl. No.: 594,167

[22] Filed: Oct. 9, 1990

[30] Foreign Application Priority Data

Oct. 13, 1989 [JP] Japan .................. 1-267239

[51] Int. Cl.$^5$ .................. B60C 9/18; B60C 9/22
[52] U.S. Cl. .................. 152/527; 152/531
[58] Field of Search .......... 152/526, 527, 529, 531, 152/532, 533, 536, 537

[56] References Cited

U.S. PATENT DOCUMENTS

| | | | |
|---|---|---|---|
| 4,129,162 | 12/1978 | DeWitt | 152/527 |
| 4,184,530 | 1/1980 | Mirtain | 152/527 |
| 4,219,601 | 8/1980 | Inoue et al. | 152/527 |
| 4,293,019 | 10/1981 | Maiocchi . | |
| 4,407,347 | 10/1983 | Mirtain | 152/527 |
| 4,445,560 | 5/1984 | Musy . | |
| 4,589,461 | 5/1986 | Ohkuni et al. | 152/527 |
| 4,832,102 | 5/1989 | Domchick | 152/527 |
| 4,890,659 | 1/1990 | Harakon et al. | 152/531 |

FOREIGN PATENT DOCUMENTS

| | | | |
|---|---|---|---|
| 1182274 | 6/1959 | France . | |
| 2429678 | 4/1980 | France . | |
| 61-75002 | 4/1986 | Japan . | |
| 61-275005 | 12/1986 | Japan | 152/531 |

OTHER PUBLICATIONS

*Mechanics of Pneumatic Tires*, ed. Samuel Clark: U.S. Dept. of Transportation, Aug. 1981, pp. 129–130.

Primary Examiner—Michael W. Ball
Assistant Examiner—Adrienne C. Johnstone
Attorney, Agent, or Firm—Birch, Stewart, Kolasch & Birch

[57] ABSTRACT

A tire for motor cycles has a belt layer containing aromatic polyamide fiber cords spirally wound around a carcass substantially parallel to the equator of a tire, wherein the belt layer is imaginarily divided into a central region (M) and shoulder regions (S and S) at the border points (P and P) spaced apart in the axial direction by a distance of 0.25 times to 0.35 times the tread width (TW) from the equator of a tire and the initial modulus of elasticity of the belt cords in the central region (M) is set to be larger than that of the cords in the shoulder regions (S and S).

1 Claim, 3 Drawing Sheets

TIRE FOR MOTOR CYCLES INCLUDING A SPIRALLY WOUND AROMATIC POLYAMIDE CORD BELT

BACKGROUND OF THE INVENTION

The present invention relates to a tire for motor cycles, which can improve the high speed durability by controlling the growth in the outer diameter of the tire during high speed running so as to prevent heat generation.

Recently, the technical development relating to motor cycles is remarkable providing motor cycles having maximum speed performances of more than 300 km/h. Accordingly, the tires mounted on such motor cycles are required to possess high speed durability.

As to the motor cycles, heretofore, in order to increase high speed performance, there are provided tires having an increase of rigidity in the tread region which is achieved by crossing cords of a carcass and a belt layer in the same way as tires for 4-wheel vehicles and providing such tires with a spiral band layer made of nylon cords wound radially outwardly of the belt layer. However, such tires as previously described increase in the tire weight, so that problems are created such that the tread region is subjected to heat generation at high speed running.

On the other hand, in order to solve such problems, a tire with a belt ply made by a belt cord wound spirally around a carcass has been suggested. However, such a belt construction is liable to be short by strength in breakage around the center region of the tread so that the resistance to shock is reduced, while in the shoulder region, it is required to further increase the resistance to compressive fatigue in relation to the bank angle. Therefore, the aforesaid problems have still not been completely eliminated.

SUMMARY OF THE INVENTION

The present invention is based on the fact that the belt layer contains belt cords made of aromatic polyamide fiber. Further, the initial modulus of elasticity of belt cords in the central region is set to be larger than that of belt cords in the shoulder regions. Thus, is an object of the present invention to provide a tire for a motor cycle which possesses improved high speed durability by restraining the growth in the outer diameter of the tire during high speed running to prevent heat generation in the tread region.

According to one aspect of the present invention, a tire for motor cycles comprises a carcass composed of at least one carcass ply containing carcass cords of an aromatic polyamide fiber laid at an angle of 60°~90° with respect to the equator of the tire and extending from the tread through sidewalls and folded at each edge wrapped around the bead core of the bead regions, and a belt layer composed of at least one belt ply containing belt cords of aromatic polyamide fibers wound spirally around the carcass substantially parallel to the equator of the tire. The belt layer has a central region (M) which is positioned between points (P), each spaced apart in the axial direction by a distance of 0.25 to 0.35 times the tread width (TW) from the equator and in which the belt cords have an initial modulus of elasticity larger than that of belt cords laid on shoulder regions (S) which are positioned axially outside said points (P).

The belt cord in the central region (M) may have a twist number of 30×30T/10 cm or more and 35×35T/10 cm or less, and the belt cord in said shoulder region (S) have a twist number of 35×35T/10 cm or more and 40×40T/10 cm or less. Thus, the first and second twist numbers are always the same for the belt cord of the present invention.

As the carcass ply and the belt ply are formed by cords made of aromatic polyamide fibers, the strength of such carcass and belt layer are larger than that made of nylon or polyester fiber cords. And the belt cords spirally wound in parallel to the equator of the tire prevent the growth of the outer diameter of the tire during high speed running.

Further, belt cords used in the central region M are set to be larger in the initial modulus of elasticity than that in the shoulder regions S, so that the strength against breakage in the central region M is increased so as to improve the resistance to shock, while in the shoulder regions, resistance to compressive fatigue becomes large. Therefore, the aforesaid growth in the outer diameter of the tire is further restrained so as to prevent heat generation in the tread region, whereby high speed durability of the tire is increased.

BRIEF DESCRIPTION OF THE DRAWINGS

An embodiment of the present invention will now be described, by way of example, referring to the attached drawings, in which.

DETAILED DESCRIPTION OF THE INVENTION

Figure 1:
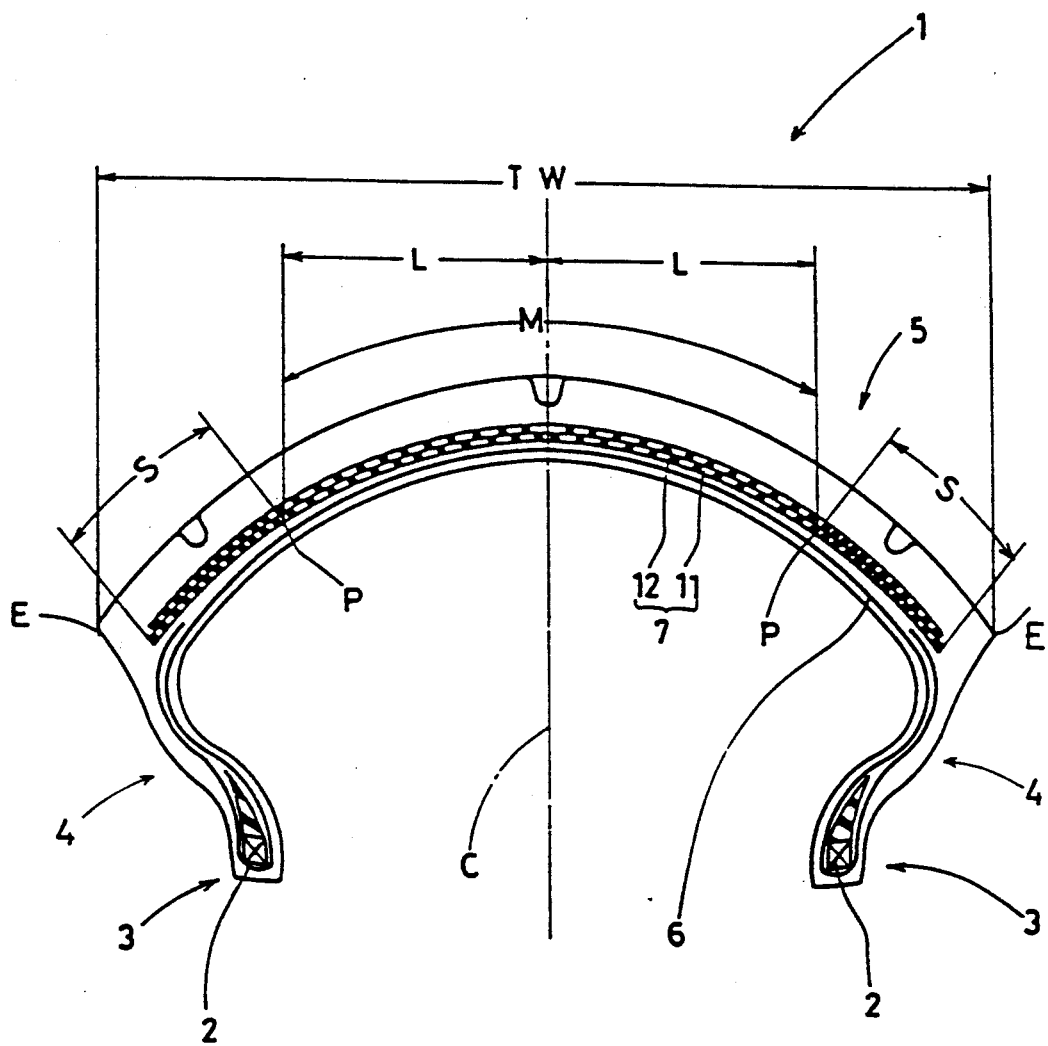
FIG. 1 is a sectional view showing one embodiment of the present invention.
Figure 2:
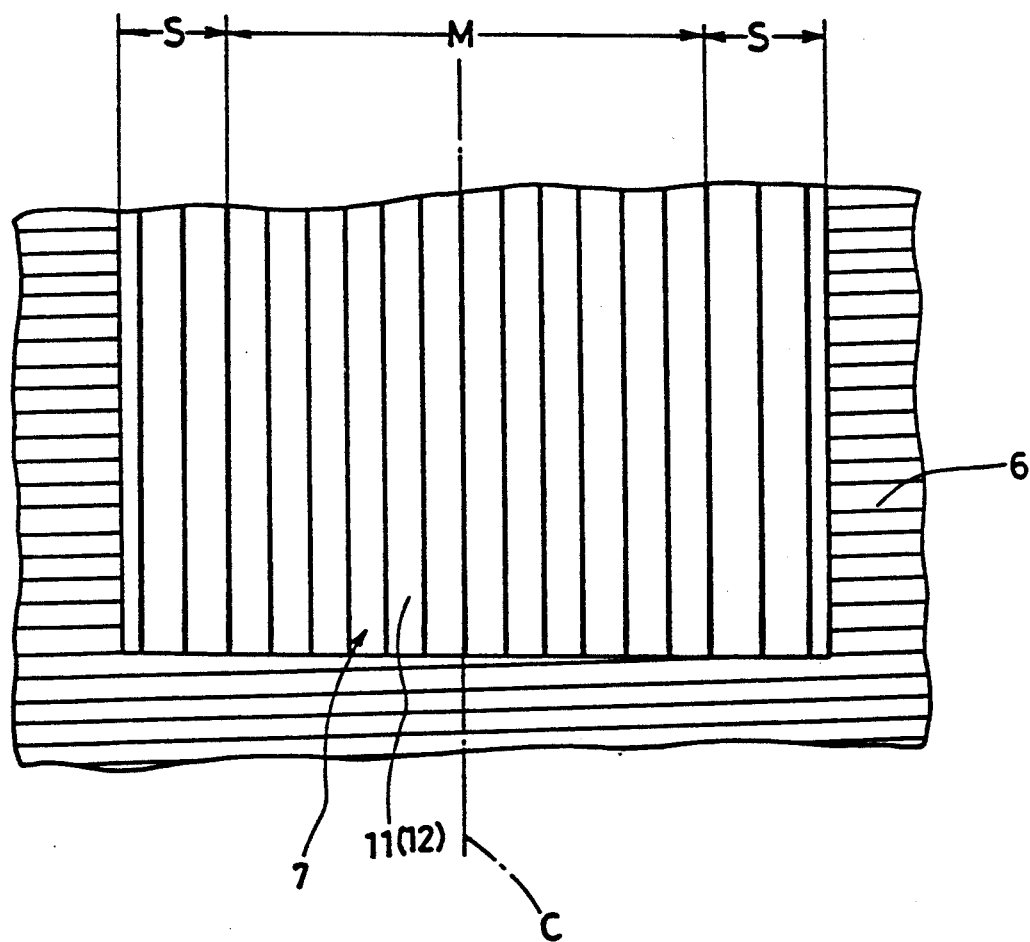
FIG. 2 is a plan view showing the arrangement of belt cords and carcass cords.

In the Figures, a tire 1 for motor cycle has a pair of bead regions 3 and 3, each containing a bead core 2, a pair of sidewalls 4 and 4 extending radially outwardly from each bead region 3, and a tread 5 connected between the outer edges of the sidewalls walls 4. And the tire 1 is reinforced by a carcass 6 extending from said tread 5 through sidewalls 4 to the bead regions 3 and wrapped around the bead cores 2 at each edge thereof, and a belt layer 7 arranged radially outside the carcass.

The carcass 6, according to the present embodiment comprises one carcass ply containing carcass cords made by twisting two yarns each having 1500 denier of aromatic polyamide fiber and laid at an angle ranging from 60 deg. to 90 deg. with respect to the equator of the tire, which is a radial or a semiradial construction.

A belt layer 7 consists of two belt plies arranged radially outside the carcass 6. A belt ply adjacent to the carcass 6 is referred to as the first belt ply 11 and the succeeding one in turn as the second belt ply 12. The first belt ply 11 is formed by a spirally wound belt cord made of an aromatic polyamide fiber nearly parallel to the equator C of the tire.

The second belt ply 12 is about same width as the first belt ply 11, and is formed by that a belt cord made of the same aromatic polyamide fiber as the first belt ply cord and spirally wound in the reverse turning direction to the first belt ply cord and nearly parallel to the equator C of the tire.

As to each belt cord of the first and second belt plies 11 and 12, the twist number of the cord (defined as a number of twist turns per unit length) axially inside of the border point (P) is different from the twist number of the cord disposed axially outside the border point (P).

The aforesaid border point (P) is a point on the belt layer 7, which is spaced apart from the equator C by a distance of 0.25 to 0.35 times the tread width TW which is the axial length between both tread outer edges E and E.

By the border points (P and P), the belt layer 7 is imaginarily divided into the central region M defined between the border points (P and P) and the shoulder regions S and S defined as being axial outside of said border point P.

said belt cords of said central region M and said shoulder regions S in the present embodiment are formed by twisting two yarns made of 1500 denier aromatic polyamide fibers, wherein the twist number CT of the cord in the central region M is set at 30 or more and 35 or less, and the twist number CT in the shoulder regions S is set at 35 or more and 40 or less.

when the twist number CT of belt cord becomes larger, the initial modulus of elasticity of the cord becomes smaller, on the contrary, when the twist number CT becomes smaller, the initial modulus of elasticity becomes larger.

The inventor tested the relation between the initial modulus of elasticity, that is, the twist number CT of cord and the fatigue strength, and between the twist number CT and the strength at breakage. As a result, the mutual relation between both is confirmed as shown in FIG. 3.

As a result of the test, the strenght A at breakage (shown by a solid line in the figure) is maximum in the range of the twist number CT being from 30 to 35, and the fatigue strength B (shown by a broken line) is maximum in the range of the twist number CT being from 35 to 40.

On the other hand, the belt layer 7, in order to resist the large shock in the central region M thereof, requires high strength at breakage to the belt cords. While for the shoulder regions, in relation to the bank angle, the resistance to compressive fatigue is highly required.

Figure 3:
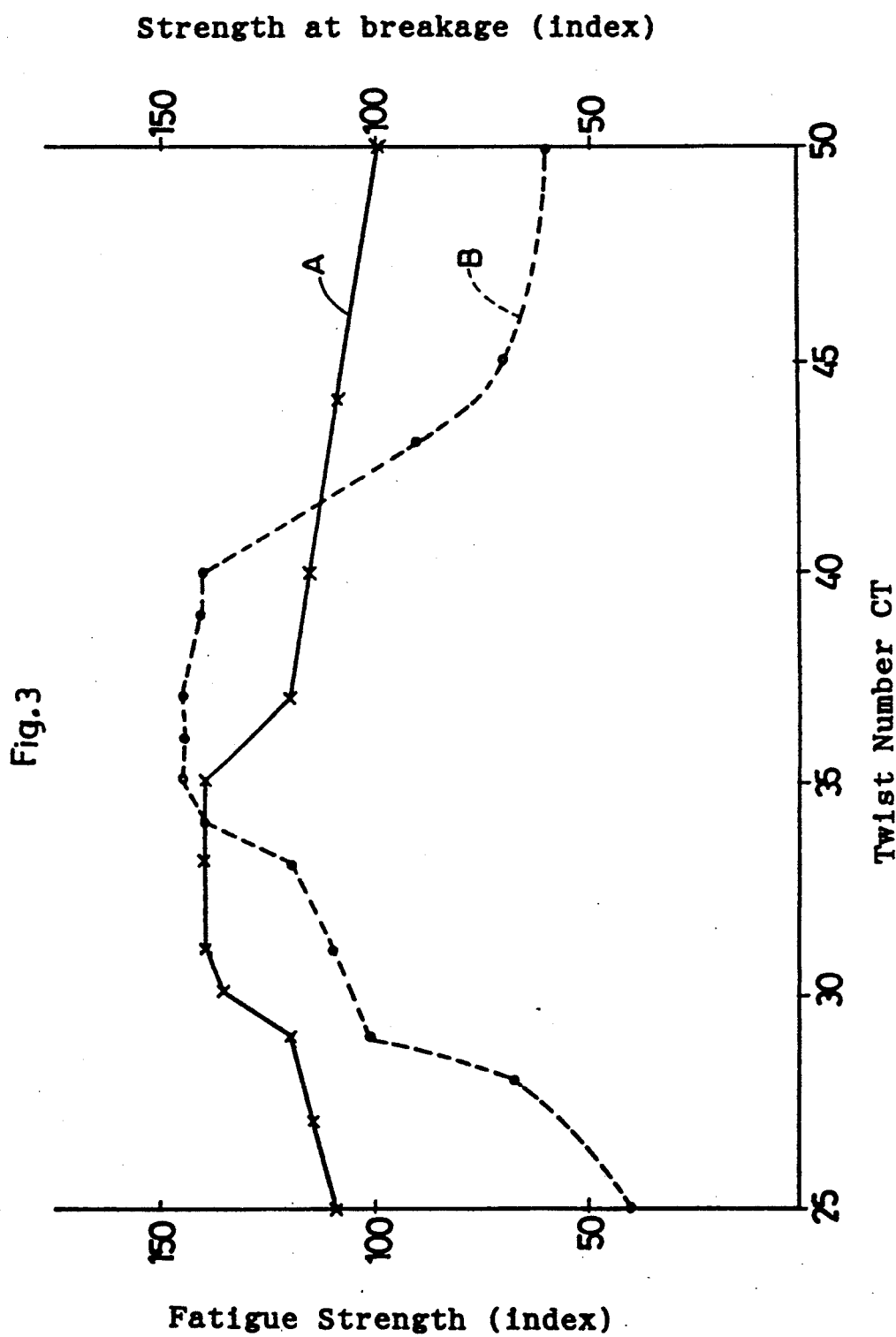
FIG. 3 is a graph showing each relationship between the twist number of cords, and fatigue life and breaking strength.

Accordingly, from the results as shown in FIG. 3, the twist number CT of belt cord in the central region M is selected from the range from 30 to 35 so that the initial modulus of elasticity of said belt cord can be set in the range from 2800 kg/mm$^2$ to 4100 kg/mm$^2$. Moreover, the twist number CT of belt cord in the shoulder region S is selected from the range from 35 to 40 so that the initial modulus of elasticity can be set in the range from 2200 kg/mm$^2$ to 2800 kg/mm$^2$. Accordingly, the initial modulus of elasticity of the belt cord is set to be larger in the central region than in the shoulder region.

As the means to make the initial modulus of elasticity large in the central region M, it is possible that the cross-sectional area of the belt cord in the central region M is made to be larger than that of the belt cord in the shoulder regions S.

EXAMPLE

Test tire having a size of 160/60R17 were produced according to the specifications shown in FIG. 1 and Table 1, and the high speed durability and the strength of the tire were evaluated under an internal pressure of 2.9 kgf/cm$^2$ and 260 kg load. In table 1, tires of the present invention are shown as examples 1 to 3; the prior tires are shown as comparisons 1 to 5, and the tires excluding the structure of the invention are shown as comparison 6 to 9.

1. high speed durability test

High speed durability test was performed on a drum tester, starting from a speed of 80 km/h. After 2 hours running, the speed was stepped up by 10 km/h, then again after each two hours running. The total running distance when the tires was destroyed was taken as the durability index by using 100 as the measured value for the comparison 9. The higher index is better, and 120 index is the passing level.

2. Tire strength test;

The test was carried out according to JIS K 6366, the results were expressed as indexes by using 100 as the measured value for the comparison 9. The higher index is better, over 115 index is the passing level.

As previously described, the tire for a motor cycle according to the present invention is provided with the carcass and the belt layer each made from aromatic polyamide fiber cords. Further, the initial modulus of elasticity of the belt cord is set to be larger in the central region than that in the shoulder region, so that the central region is improved in impact resistance, and the shoulder region is increased in resistance to compressive fatigue so as to restrain the growth of the outer diameter of the tire, resulting in preventing heat generation, so that high speed durability is improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | example 1 | example 2 | example 3 | comparison 1 | comparison 2 | comparison 3 |
|---|---|---|---|---|---|---|
| carcass |  |  |  |  |  |  |
| cord material | aromatic polyamide | aromatic polyamide | aromatic polyamide | nylon | nylon | polyester |
| cord construction | 1500 d/2 | 1500 d/2 | 1500 d/2 | 1260 d/2 | 1260 d/2 | 1000 d/2 |
| twist number CT (per 10 cm) | 35 × 35 | 35 × 35 | 40 × 40 | 38.2 × 38.2 | 38.2 × 38.2 | 48 × 48 |
| cord angle (deg.) | 90 to 86 | 90 to 86 | 90 to 86 | 90 to 86 | 90 to 86 | 90 to 86 |
| belt layer |  |  |  |  |  |  |
| cord material | aromatic polyamide | aromatic polyamide | aromatic polyamide | nylon | aromatic polyamide | nylon |
| cord construction | 1500 d/2 | 1500 d/2 | 1500 d/2 | 1260 d/2 | 1500 d/2 | 1260 d/2 |
| number of plies | 2 | 2 | 2 | 2 | 2 | 2 |
| cord angle (deg.) | ~0°~ | ~0°~ | ~0°~ | 16 | 16 | 16 |
| twist number CT (per 10 cm) in the central region (M) | 30 × 30 | 35 × 35 | 33 × 33 | 38.2 × 38.2 | 55 × 55 | 38.2 × 38.2 |
| type of the belt layer | spiral winding | spiral winding | spiral winding | cut-end ply | cut-end ply | cut-end ply |
| twist number CT (per 10 cm) in | 35 × 35 | 40 × 40 | 35 × 35 | same as the | same as the | same as the |

TABLE 1-continued

|  |  |  |  |  |  |  |
| --- | --- | --- | --- | --- | --- | --- |
| the shoulder region (S) |  |  |  | central | central | central |
| type of the belt layer | spiral winding | spiral winding | spiral winding | region | region | region |
| band layer | — | — | full-band nylon ~0°~ | edge-band nylon ~0°~ | full-band nylon ~0°~ | — |
| high speed durability (index) | 145 | 150 | 140 | 95 | 95 | 100 |
| tire strength (index) | 125 | 120 | 115 | 200 | 150 | 210 |

|  | comparison 4 | comparison 5 | comparison 6 | comparison 7 | comparison 8 | comparison 9 |
| --- | --- | --- | --- | --- | --- | --- |
| carcass |  |  |  |  |  |  |
| cord material | polyester | polyester | aromatic polyamide | aromatic polyamide | aromatic polyamide | aromatic polyamide |
| cord construction | 1000 d/2 | 1000 d/2 | 1500 d/2 | 1500 d/2 | 1500 d/2 | 1500 d/2 |
| twist number CT (per 10 cm) | 48 × 48 | 48 × 48 | 30 × 33 | 43 × 43 | 43 × 43 | 43 × 43 |
| cord angle (deg.) | 90 to 86 | 90 to 86 | 90 to 86 | 90 to 86 | 90 to 86 | 90 to 86 |
| belt layer |  |  |  |  |  |  |
| cord material | nylon | aromatic polyamide | aromatic polyamide | aromatic polyamide | aromatic polyamide | aromatic polyamide |
| cord construction | 1260 d/2 | 1500 d/2 | 1500 d/2 | 1500 d/2 | 1500 d/2 | 1500 d/2 |
| number of plies | 2 | 2 | 2 | 2 | 2 | 2 |
| cord angle (deg.) | ~0°~ | ~0°~ | ~0°~ | ~0°~ | ~0°~ | ~0°~ |
| twist number CT (per 10 cm) in the central region (M) | 38.2 × 38.2 | 55 × 55 | 42 × 42 | 40 × 40 | 28 × 28 | 50 × 50 |
| type of the belt layer | cut-end ply | spiral winding | spiral winding | cut-end ply | spiral winding | spiral winding |
| twist number CT (per 10 cm) in the shoulder region (S) | same as the central region | same as the central region | 42 × 42 | 33 × 33 | 42 × 42 | 30 × 30 |
| type of the belt layer | | | spiral winding | spiral winding | spiral winding | spiral winding |
| band layer | — | — | — | — | — | — |
| high speed durability (index) | 95 | 100 | 100 | 105 | 70 | 100 |
| tire strength (index) | 205 | 90 | 112 | 115 | 120 | 100 |

I claim:

1. A motor cycle tire comprising a carcass composed of at least one carcass ply extending from a tread through sidewalls and folded at each edge around bead cores of bead regions, and a belt layer composed of at least one belt ply arranged radially outside the carcass, said tread having an outer periphery extending from a tire equator, outwardly in the tire axial direction along a circular arc and defining a tire maximum width by the distance between tread ends, said carcass ply containing carcass cords of aromatic polyamide fiber laid at an angle of 60° to 90° with respect to the equator of the tire, said belt ply containing belt cords made of an aromatic polyamide fiber spirally wound so as to be substantially parallel to the equator of the tire, wherein said belt layer having a central region (M) which is positioned between border points (P) and shoulder regions (S) positioned axially outside said border points (P), each border point (P) being spaced apart in the axial direction by a distance of 0.25 times to 0.35 times the tread width (TW) from the tire equator and containing belt cords having an initial modulus of elasticity which is larger than that of belt cords laid in the shoulder regions (S), said belt cords in the central region (M) having a twist number of between 30×30T/10 cm and 35×35T/10 cm, and the belt cords in said shoulder region (S) having a twist number of between 35×35T/10 cm and 40×40T/10 cm, whereby the first and second twist numbers are always the same for the belt cord.

* * * * *